United States Patent [19]
Garcia

[11] Patent Number: 5,959,375
[45] Date of Patent: Sep. 28, 1999

[54] DEVICE AND METHOD FOR REDIRECTING ELECTROMAGNETIC SIGNALS

[76] Inventor: Ernest J. Garcia, 823 Piedra Larga, NE., Albuquerque, N.Mex. 87123

[21] Appl. No.: 08/940,841

[22] Filed: Sep. 30, 1997

[51] Int. Cl.⁶ ................................................. F16H 21/22
[52] U.S. Cl. .................................. 310/40 MM; 359/212; 310/DIG. 6
[58] Field of Search .................................... 359/197, 198, 359/212, 223; 310/40 MM, 42, DIG. 6, 309; 29/596

[56] References Cited

U.S. PATENT DOCUMENTS

| | | | |
|---|---|---|---|
| 4,393,129 | 7/1983 | Glashauser et al. | 430/296 |
| 4,674,319 | 6/1987 | Muller et al. | 73/24.1 |
| 4,875,215 | 10/1989 | Hughes | 372/6 |
| 5,025,346 | 6/1991 | Tang et al. | 361/283.1 |
| 5,190,637 | 3/1993 | Guckel | 205/118 |
| 5,206,983 | 5/1993 | Guckel et al. | 29/598 |
| 5,226,099 | 7/1993 | Mignardi et al. | 385/19 |
| 5,253,263 | 10/1993 | Jansen et al. | 372/45 |
| 5,327,033 | 7/1994 | Guckel et al. | 310/40 MM |
| 5,378,583 | 1/1995 | Guckel et al. | 430/325 |
| 5,412,186 | 5/1995 | Gale | 219/679 |
| 5,496,668 | 3/1996 | Guckel et al. | 430/9 |
| 5,583,688 | 12/1996 | Hornbeck | 359/291 |
| 5,631,514 | 5/1997 | Garcia et al. | 310/309 |
| 5,794,761 | 8/1998 | Renaud et al. | 200/181 |

OTHER PUBLICATIONS

Surface Micromachining for Microsensors and Microactuators, Roger T. Howe, reprinted with permission from J. Vac. Sci. Technol. B, vol. 6, No. 6, pp. 1809–1813, Nov./Dec. 1988.

Integrated Movable Micromechanical Structures for Sensors and Actuators, Long–Sheng Fan, et al., reprinted from IEEE Trans. Electron Devices, vol. 35, No. 6, pp. 724–730, Jun. 1988.

Surface Micromachined Microengine, Ernest J. Garcia, et al., Sensors and Actuators, A48 (1995) 203–214, 1995 Elsevier Science S.A.

Linear Vibromotor–Actuated Micromachined Microreflector for Integrated Optical Systems, Michael J. Daneman, et al., Solid–State Sensor and Actuator Workshop, Jun. 2–6, 1996.

Microfabricated Hinges, K.S.J. Pister, et al., Sensors and Actuators A. 33 (1992) 249–256, 1992 Elsevier Sequoia.

Fabrication of Microstructures with High Aspect Ratios and Great Structural Heights by Synchrotron Radiation Lithography, Galvanoforming, and Plasti Moulding (LIGA Process) E. W. Becker, et al., Microelectronic engineering 4 (1986) pp. 35–56.

LIGA Process: Sensor Construction Techniques Via X–Ray Lithography, W. Ehrfeld, et al., Reprinted from Rec. of the IEEE Solid–State Sensor and Actuator Workshop, 1988, pp. 1–4.

Micromechanics Via X–ray Assisted Processing, H. Guckel, et al., Journal of Vacuum Science and Technology, A12(4) Jul./Aug. 1994, pp. 2559–2564.

Expanding Beyond Silicon, Semiconductor Research R&D Magazine, Jun. 1996.

Micromirrors Project Better Images, BYTE Magazine, Jul. 1996, Dave Andrews.

Picture The Beauty of Digital Light (Back to White Papers), Larry J. Hornbeck, http://www.ti.com/dlp/docs/business/resources/white/newmems/lintro.htm.

*Primary Examiner*—Nestor Ramirez
*Assistant Examiner*—Joseph Waks
*Attorney, Agent, or Firm*—Kevin Lynn Wildenstein, Esq.

[57] ABSTRACT

A device fabricated to redirect electromagnetic signals, the device including a primary driver adapted to provide a predetermined force, a linkage system coupled to the primary driver, a pusher rod rotationally coupled to the linkage system, a flexible rod element attached to the pusher rod and adapted to buckle upon the application of the predetermined force, and a mirror structure attached to the flexible rod element at one end and to the substrate at another end. When the predetermined force buckles the flexible rod element, the mirror structure and the flexible rod element both move to thereby allow a remotely-located electromagnetic signal directed towards the device to be redirected.

29 Claims, 8 Drawing Sheets

DEVICE AND METHOD FOR REDIRECTING ELECTROMAGNETIC SIGNALS

GOVERNMENT RIGHTS

This invention was made with United States Government support under Contract No. DE-AC04-94AL85000 awarded by the U. S. Department of Energy. The Government has certain rights in this invention.

BACKGROUND OF THE INVENTION

In the field of micromechanics, mechanical devices are fabricated which are on the scale of micrometers (i.e., approximately $1 \times 10^{-6}$). In particular, electrically powered micrometer-sized micro-motors (or "micro-engines" as they are known) exist which are designed to provide rotational motion in order to drive a mechanical load. These devices are typically electrically powered and are generally constructed using surface machining techniques, which can be generally applicable to the micro, milli and macro domains. However, a similar mechanism may be designed with LIGA technology ("Lithographie Galvanoforming Abforming", an acronym which evolved from the Karlsruhe Nuclear Research Center in Germany). This type of device, for example, is described in U.S. Pat. No. 5,631,514 to Garcia et al., titled "Microfabricated Microengine for Use as a Mechanical Drive and Power Source in the Microdomain and Fabrication Process" and is sufficient to drive a mechanical load at micrometer scale for a variety of end-use applications.

While applications using a micromachined mirror are found in the prior art (such as the article titled "Micromirrors Project Better Images", Byte magazine, July 1996), such mirrors are fabricated to remain substantially in the same plane as the plane the mirror was originally fabricated in. The invention disclosed herein differs from existing micromirror technology in several respects. First, until the present invention, micromirror technology attempted to rely on a rigid link to raise the mirror out of the plane of the wafer, but with great difficulty and varied results. Second, until the present invention, there was no practical way to mechanically move a micrometer-sized mirror up and out of the plane of the wafer, but rather, was done manually with a probe tip which typically resulted in damage to the mirror, the nearby fabricated structures or the wafer itself. Third, raising the micrometer-sized mirror manually was not a reliable procedure due to the unpredictable forces generated on the mirror structure and other nearby structures. Fourth, manually raising the mirror is impractible for almost all commercial applications. Fifth, prior art is devoid of technology which allows the mirror to be substantially raised out of the wafer's plane of fabrication. Finally, the planar structures created by surface micromachining present difficulties with developing a sufficient moment to move fabricated structures out of and into the x, y coordinate plane when actuated by those same planar structures, wherein the difficulty arises due to the short moment arms (in thickness direction of the z-coordinate axis) which are created during the fabrication process.

The present invention overcomes the prior art's deficiencies by providing an apparatus to selectively drive a specially designed output gear mechanism which, in turn through a series of linkage systems and other structures, engages a mirror to move the mirror out of and into the mirror's plane of fabrication by buckling. Similarly, the present invention allows selective operation of the mirror to any predefined angle in the x, y or z coordinate axis. The present invention is useful in certain industries (such as the defense industry) and is especially useful to redirect remotely located electromagnetic signals from an electromagnetic source such as an optical source having an optical beam diameter ranging from 100 to 400 micrometers. Consequently, the present invention may be utilized in nuclear detonation systems, conventional munitions detonation systems, optical scanners, in optical switching applications for fiberoptic communication systems, for assembly of other michromachinery and other related applications. For example, with the advent of fiber optic telecommunication systems has created the need for small, highly efficient, low-cost optical switches that are used to redirect optical signals such as provided by the present invention. Additionally, the present invention is useful in other applications requiring larger switching systems.

It is therefore an object of the present invention to provide a device for redirecting optical signals comprising a primary driver means, a linkage system attached to the primary driver means to amplify the input force from the primary driver means, a pusher rod rotatably coupled to the linkage system, a flexible link element connected to the pusher rod and adapted to buckle upon a predetermined force applied by the pusher rod and a mirror being coupled to the pusher rod.

It is a further object of the present invention to provide a micrometer-sized device adapted to redirect signals by use of a mirror structure and a flexible link adapted to buckle, both the flexible link and the mirror structure fabricated from the plane of a wafer and capable of movement into or out of the wafer's plane of fabrication.

It is also an object of the present invention to provide a device for redirecting electromagnetic signals including a driver means adapted to provide a predetermined force, a linkage system attached to the primary driver means, a pusher rod in mechanical communication with the linkage system, a flexible link element in mechanical communication with the linkage system and adapted to buckle upon the predetermined force, a pusher rod in mechanical communication with the flexible link element and a micrometer-sized mirror in mechanical communication with the pusher rod.

It is a further object of the present invention to disclose a device adapted to redirect electromagnetic signals by use of a movable, deformable micrometer mirror structure without any manual intervention.

It is an object of the present invention to provide a device fabricated on a substrate in the microdomain for redirecting signals including a flexible link element adapted to buckle upon a predetermined force applied by a pusher rod to thereby raise a micrometer fabricated mirror into a preselected position above the plane of the fabricated substrate into a third coordinate dimension without any manual intervention.

It is also an object of the present invention to provide a device for redirecting signals having a mirror structure fabricated from the plane of a wafer and capable of movement into or out of the wafer's plane of fabrication, the mirror structure including at least one support structure attached to the wafer, to thereby permit rotation of the mirror structure out of the plane of the wafer by support structure bending.

It is also an object of the present invention to provide a micrometer-sized device for redirecting signals having a mirror structure fabricated from the plane of a wafer and capable of movement into or out of the wafer's plane of fabrication, the mirror structure attached at one end to the wafer by at least one support structure, and at the other end, attached to a flexible link by a plurality of hinges, to thereby allow rotation of the mirror structure.

It is another object of the present invention to provide an apparatus for redirecting electrical signals between two substrates, the invention including a contact structure fabricated from the plane of a first wafer and in electrical communication with an electical circuit fabricated on the first wafer, the contact structure being capable of movement into or out of the first wafer's plane of fabrication so as to electrically contact a second electrical circuit fabricated on a second wafer, thereby allowing redirection of an electrical signal between two or more wafers.

It is also an object of the present invention to provide a device for redirecting electrical signals on a wafer, the invention including a contact structure fabricated from the plane of a wafer and in electrical communication with an electical circuit fabricated on the wafer, the contact structure being capable of movement within the first wafer's plane of fabrication so as to electrically contact a second electrical circuit fabricated on the wafer, thereby allowing redirection of an electrical signal between two or more electrical circuits fabricated on the same wafer.

SUMMARY OF THE INVENTION

The present invention comprises a primary driver means, a linkage system mechanically coupled to the primary driver to thereby amplify the input force provided by the primary driver, a pusher rod rotationally coupled to the linkage system, a flexible element mechanically coupled to the pusher rod and adapted to buckle upon a predetermined force, and a mirror structure coupled to the flexible rod element.

The present invention is a single degree of freedom system, which is a system where all elements of the invention move in unison. In particular, all structural elements are formed on a single crystal silicon wafer. As such, a plurality of electrostatic or magnetic circuits control the operation of the primary driver means to drive the linkage system in gear-like fashion. When the linkage system is engaged, the linkage system engages the pusher rod with a predetermined force and in approximately a single coordinate direction to thereby provide such force to the flexible link. To assist in the unidirectional axial thrust of the pusher rod, a plurality of optional guides attached to the wafer can be employed. The flexible link is adapted to buckle at the predetermined force. When buckled, the flexible link engages the mirror structure to thereby allow the mirror structure to move into or out of the wafer's plane of fabrication at any predetermined angle with respect to the wafer. Preferably, all components are fabricated in the micro domain, but may be larger as desired.

The present invention overcomes the difficulty of raising a mirror which has been fabricated in the plane of a wafer through a design that utilizes the phenomenon known as buckling to provide sufficient forces to raise a micrometer-sized mirror structure up and out of the wafer's plane of fabrication. By applying axial forces to the push rod and thereby forcing the flexible link to buckle, an internal bending moment about an axis parallel to the wafer's surface is created which can be harnessed to raise or lower the micrometer-sized mirror structure.

The novel features of the present invention will become apparent to those of ordinary skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of ordinary skill in the art from the detailed description of the invention and claims that follow.

DETAILED DESCRIPTION OF THE INVENTION

Figure 1:
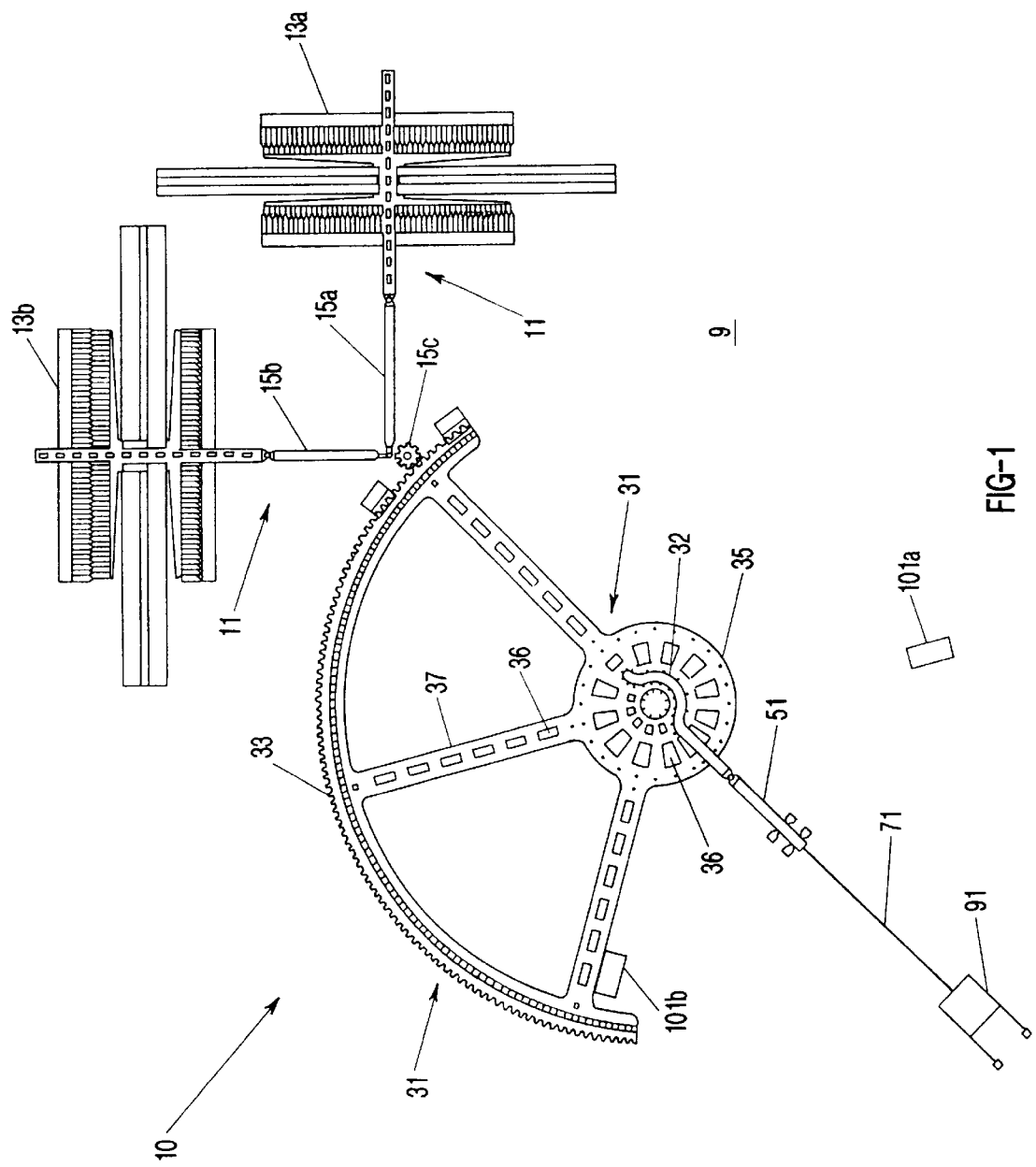
FIG. 1 is a top view of the present invention illustrating the present invention when not in operation.

In the preferred embodiment as seen in FIG. 1, the present invention 10 comprises a micrometer-sized primary driver means 11, a linkage system 31 mechanically coupled in gear-like fashion to primary driver means 11 to thereby amplify the input force provided by primary driver means 11, a pusher rod 51 rotationally coupled to linkage system 31, a flexible rod element 71 mechanically coupled to pusher rod 51 and adapted to buckle or flex upon a predetermined force, a micrometer-sized mirror structure 91 coupled to flexible rod element 71, and a plurality of driver stops 101a, 101b, all integrally formed on the surface of wafer 9 by surface micromachining techniques, generally using polysilicon.

Primary driver means 11 is a general purpose actuator, and preferably, is a microengine having two synchronized actuators 13a, 13b as a power source which converts oscillatory motion from actuators 13a, 13b into rotational motion via direct linkage connections 15a, 15b to linkage system 31. In the preferred embodiment, primary driver means 11 is the microfabricated microengine disclosed in U.S. Pat. No. 5,631,514 to Garcia et al., the specification and teachings of which are hereby incorporated by reference. Alternatively, those of skill in the art will realize that any device adapted to drive an output gear or linkage system 31 can be employed as primary driver means 11.

Figure 2:
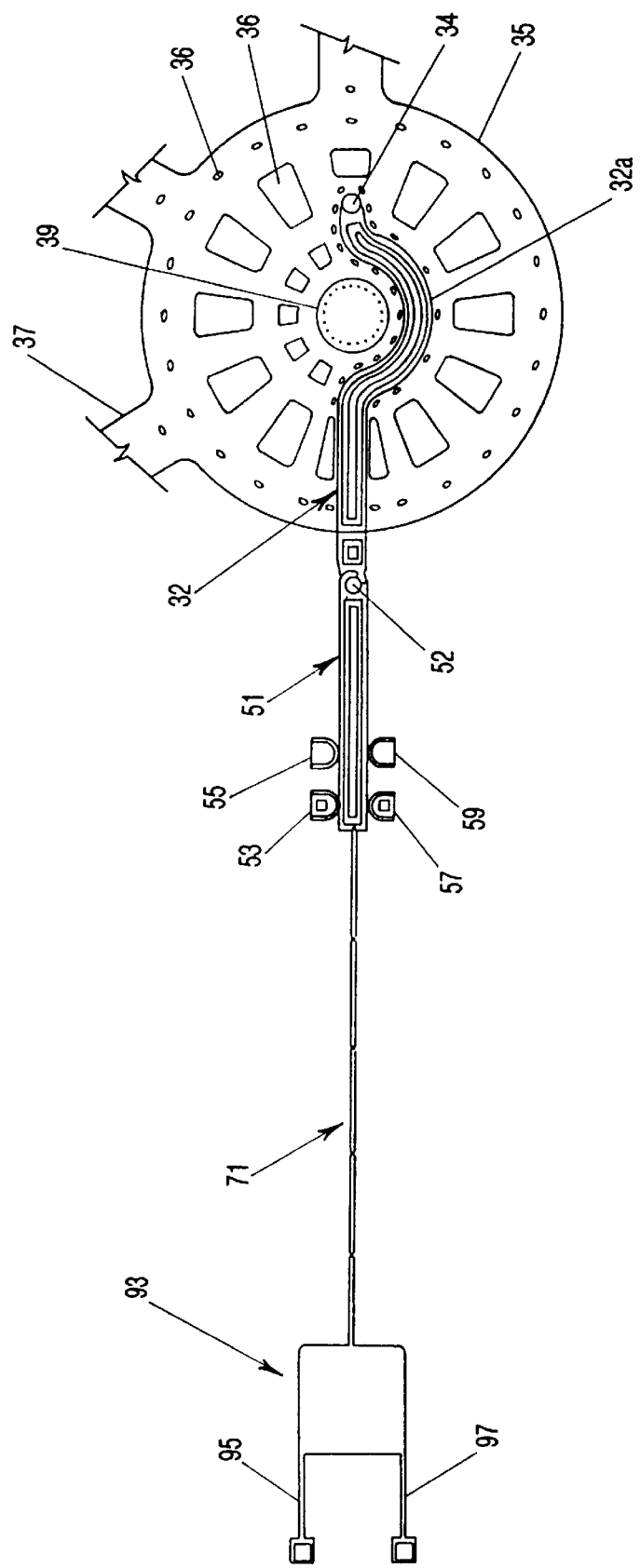
FIG. 2 is a partial top view of the present invention.

As seen in FIGS. 1 and 2, linkage system 31 is mechanically coupled in gear-like fashion to primary driver means 11 through linkage connections 15a and 15b. In particular, linkage system 31 is designed to amplify the input force provided by primary driver means 11 and includes circular hub 35 mechanically connected to wafer surface 9 by segmented gear pivot 39, an outer gear 33, a plurality of spokes 37 interconnecting hub 35 to outer gear 33, and elongated curved drive link 32. Preferably, a plurality of holes 36 (or, etch release holes) are formed upon hub 35 and spokes 37 to lighten the weight of linkage system 31, and also serve in the fabrication process to assist in the elimination of oxide. The gear teeth on outer gear 33 are adapted to mechanically communicate with the gear teeth upon linkage connections 15a and 15b. As seen in FIG. 1, linkage system 31, and more particularly outer gear 33, is not a full circular gear and is not required to be a full circular gear as will soon become apparent to those of skill in the art.

Figure 6:
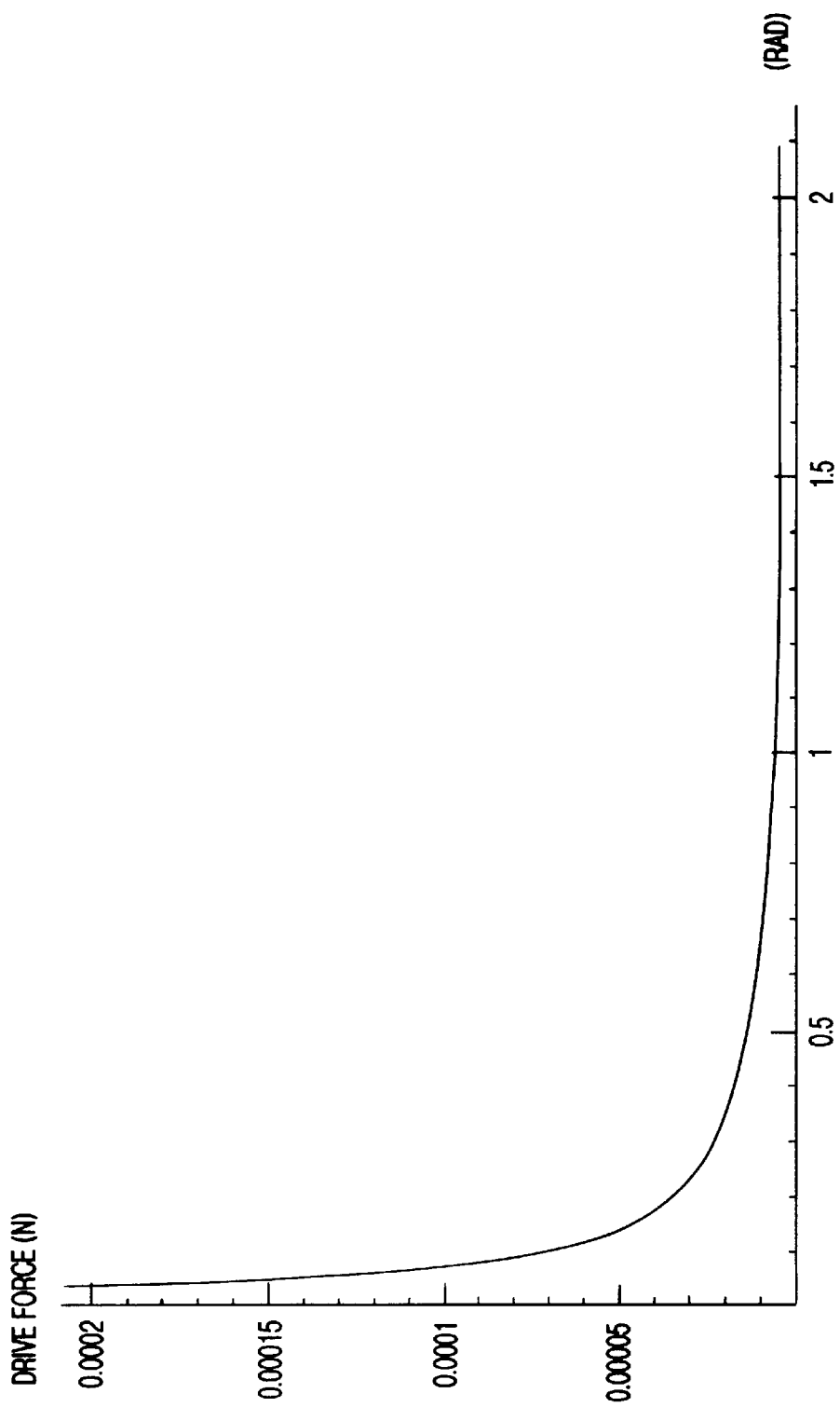
FIG. 6 is a graph illustrating the amount of force generated by the linkage system to actuate the flexible rod element and mirror structure of the present invention.

As seen in FIG. 2, elongated curved drive link 32 is fabricated to rotationally attach to circular hub 35 at pivot joint 34 which is a point that axially intersects the center of hub 35. Drive link 32 is curved at one end 32a about segmented gear pivot 39 so as not to come into contact with segmented gear pivot 39, and as shown, is designed for processing convenience to provide the necessary predetermined axial forces to achieve buckling in flexible rod 71. Optimally, when the present invention 10 is in its initial position, pivot joint 34, segmented gear pivot 39 and pivot joint 52 all line up axially to provide the greatest amount of initial force when primary driver means 11 is first engaged, and therefore, drive link 32 can be fabricated without any curved portions. This relationship, for example, is seen in FIG. 6, which graphically depicts the amount of force generated by the linkage system 31 as a function of segmented gear angle to acuate the flexible rod element 71 and mirror structure 91. Anchors tops 101a and 101b, fabricated on and attached directly to wafer 9, prevent full rotation of output gear 33, and preferably, limit total angular rotation between 0 degrees and 120 degrees. However, as those of skill in the art will come to realize, by extending the size of spokes 37, it is possible to achieve rotation up to 180 degrees. Thus, when primary driver means 11 is engaged, linkage system 31 operates to partially rotate through a predefined rotational path which defines the angle a (as seen in FIG. 3) upon which the mirror structure 91 is raised or lowered.

As seen in FIG. 2, pusher rod 51 is rotationally coupled to the other end of curved drive link 32 through pivot joint 52. Pusher rod 51 is an elongated element designed to transfer axial forces between linkage system 31 to flexible rod element 71. Because of the nature of forces involved and the axial direction required, a plurality of guides 53, 55, 57 and 59, fabricated on and attached to wafer 9, are employed to ensure that pusher rod 51 maintains an axial direction at all times during operation. Guides 53, 55, 57 and 59 are typically fixed structures fabricated apart from each other, but can include cam roller bearings for ease in guiding pusher rod 51 in an axial direction, and can also include other support structures (such as integrally formed retainer lips or interconnecting rods which interlink one or more guides) to prevent pusher rod 51 from rising out of the wafer's plane of fabrication.

At one end, flexible rod element 71 is preferably integrally formed with pusher rod 51. Flexible rod element 71 is generally designed to be thin, elongated and fabricated from polysilicon, and is necessarily fabricated to buckle or contort to form an arch-like structure when a predetermined force is applied so that it moves up and off the surface of wafer 9. When buckled, flexible rod element 71 produces a bending moment about an axis of bending which is parallel with the plane of wafer 9. With the design of the linkage system 31 and pusher rod 51, a very high initial actuation force is created when primary driver means 11 Is initially engaged, resulting in a predetermined force to buckle flexible rod element 71. As those of skill in the art may know, the critical buckling load is determined by the material used, and also generally by the equation $1/L^2$, where L is the length of the flexible rod element 71.

Figure 4:
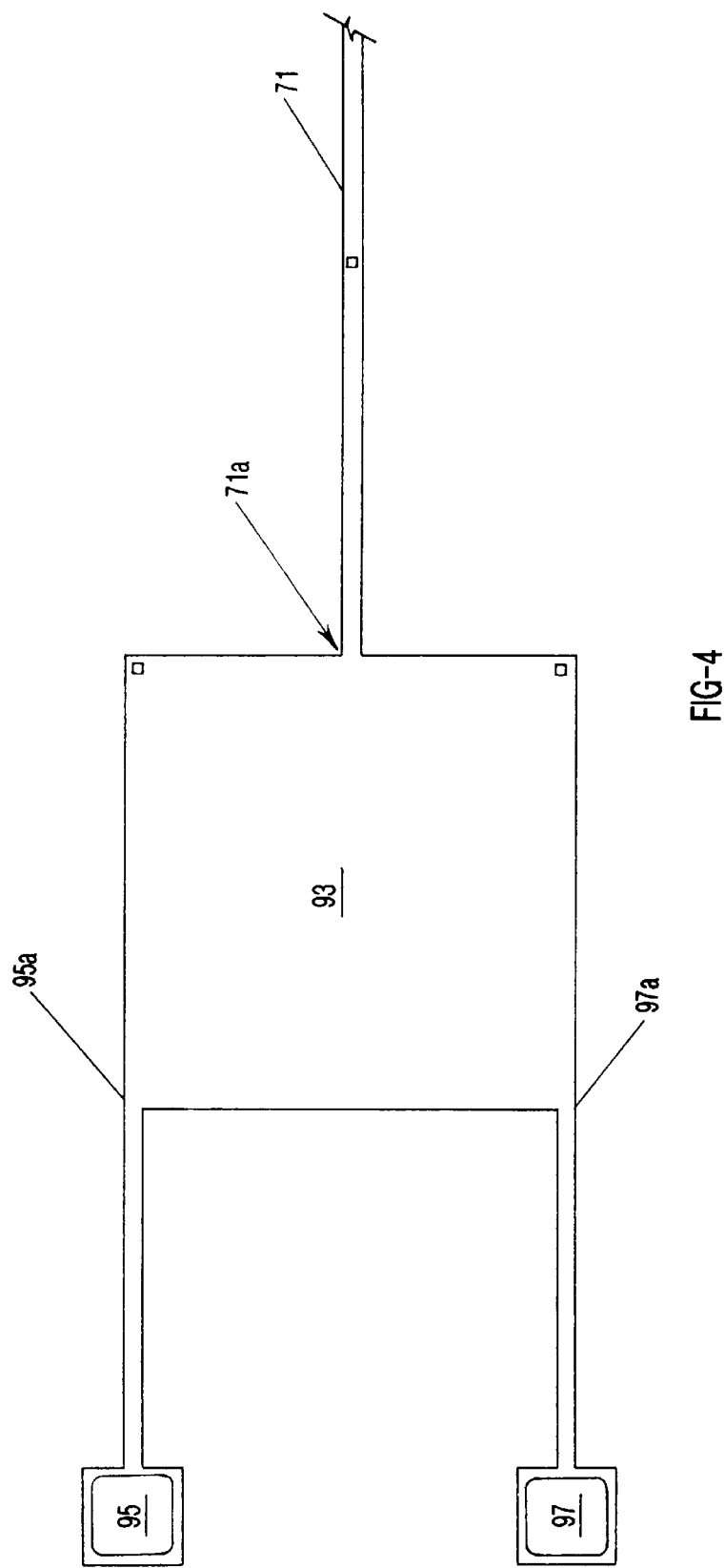
FIG. 4 illustrates the flexible rod and the mirror structure of the present invention.

At the other end of flexible rod element 71 is coupled micrometer-sized mirror structure 91 as illustrated in FIG. 4. Mirror structure 91 includes reflective mirror 93 integrally attached to wafer 9 through at least one connecting means 95 anchored to wafer 9. For further support, the present invention may employ additional connecting means (such as that identified as item 97 in FIG. 2) which is integrally attached to reflective mirror 93 on one end and anchored to wafer 9 at another end. In the preferred embodiment, reflective mirror 93 is coated with a material which enhances light reflectivity, such as gold, and can be formed into any desired geometric shape such as a square. Moreover, mirror 93 is designed to reflect other electromagnetic signals depending on the composition of mirror 93 or the type of coating applied to the surface of mirror 93.

In an alternate embodiment, reflective mirror 93 is coupled to flexible rod element 71 through at least one hinge means at point 71a (as depicted in FIG. 4) which is microfabricated by techniques known in the art, and to connecting means 95 and 97 through similar hinge means at points 95a and 97a. In fact, it should be clear to those of skill in the art that the elongated leg portion of connecting means 95 and 97 are not necessary when hinge connecting means are employed at points 95a and 97a. Further, those of skill in the art will realize that other forms of surface machining which couple mirror 93 to flexible rod element 71 and wafer 9 are within the scope and spirit of this invention.

Figure 3A:
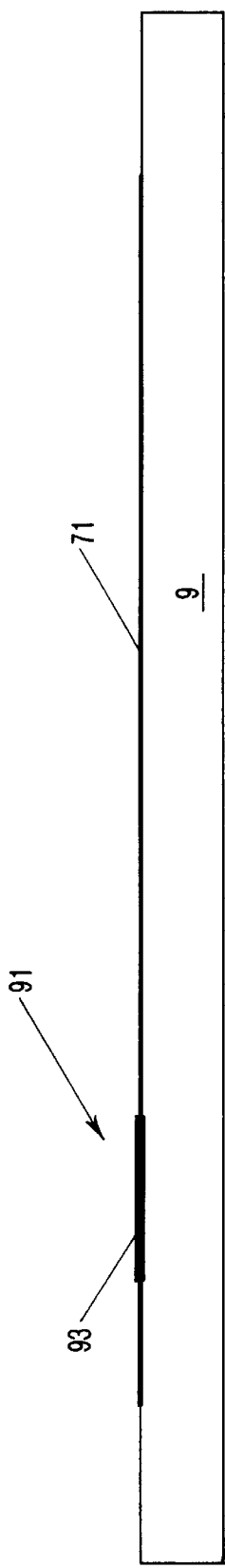
FIG. 3a is a cross-sectional view of the flexible rod element and mirror structure of the present invention when not in operation.
Figure 3B:
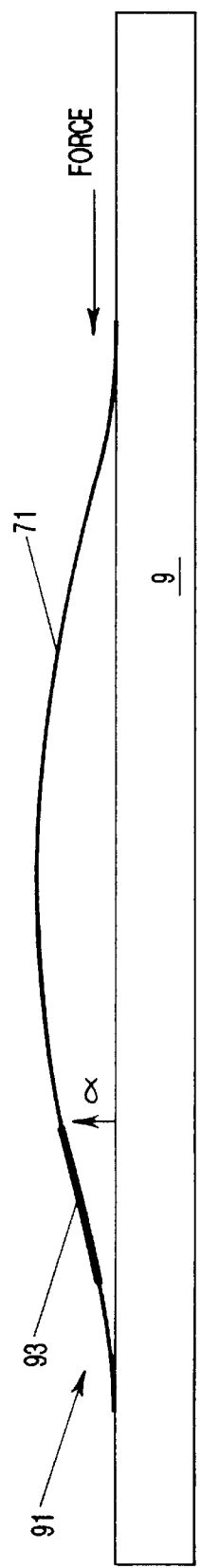
FIG. 3b is a cross-sectional view of the flexible rod element and mirror structure of the present invention when engaged to raise the mirror structure to a predefined angle.
Figure 3C:
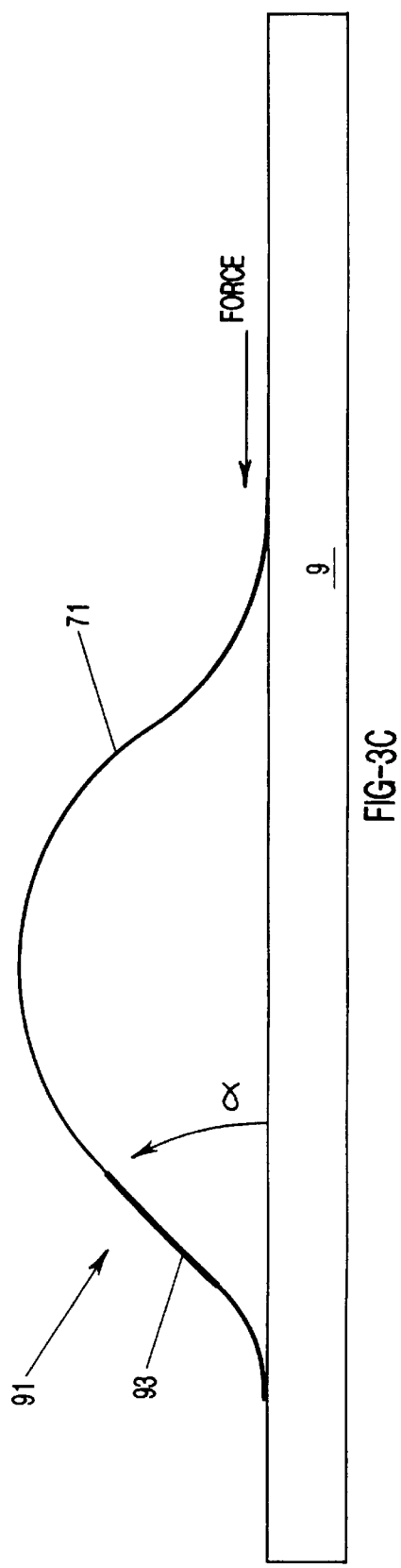
FIG. 3c is a cross-sectional view of the flexible rod element and mirror structure of the present invention when engaged to raise the mirror structure to a predefined angle.
Figure 5:
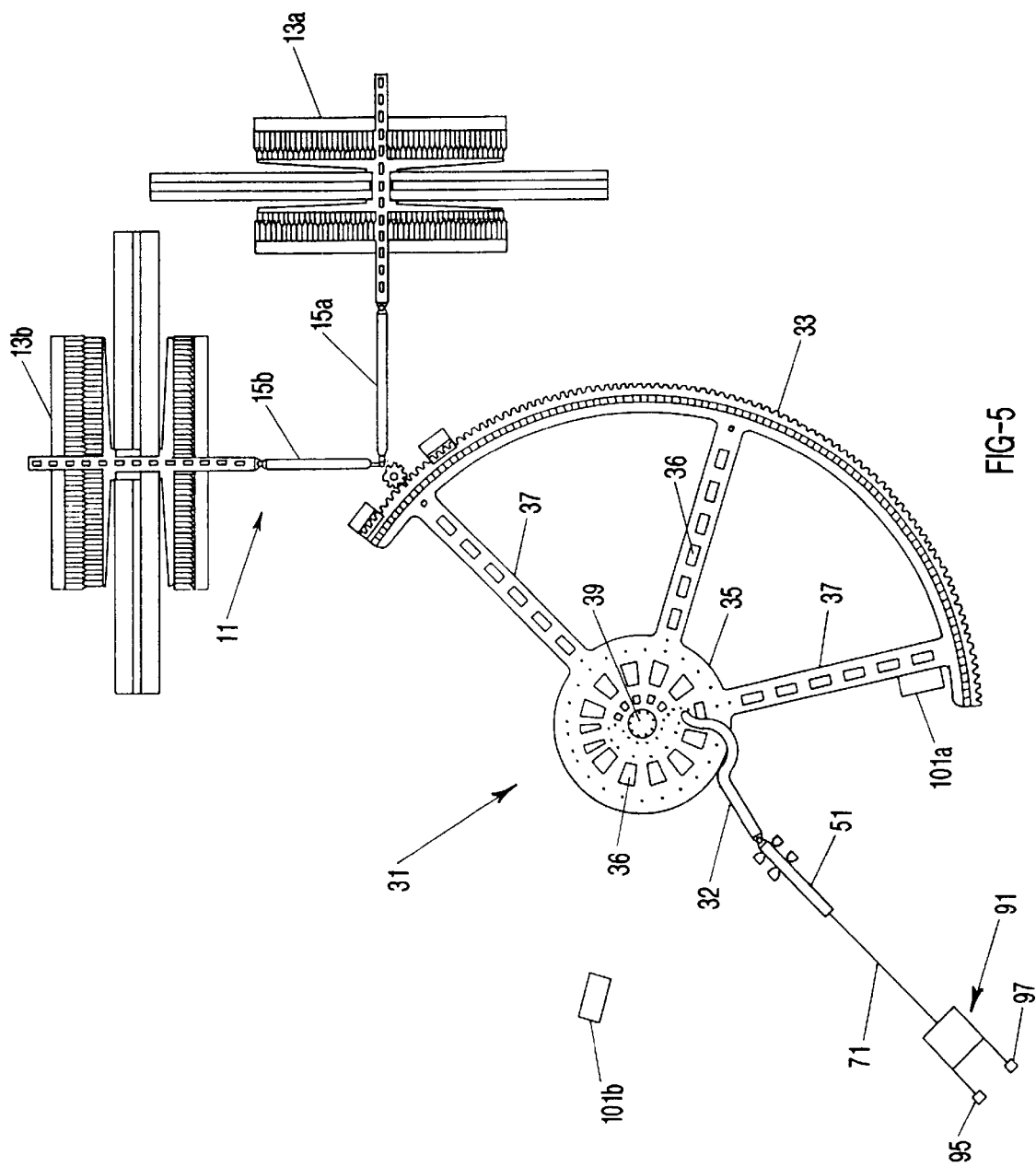
FIG. 5 is a top view of the present invention illustrating the present invention when in operation.

When the present invention is not in operation (as seen in FIGS. 1 and 3c), mirror structure 91 is positioned normally in wafer 9's plane of fabrication. In operation, primary driver means 11 is operated to engaged linkage system 31 through a predetermined force F. Linkage system 31, in turn, partially rotates thereby causing curved drive link 32 to transfer force F to pusher rod 51. The relationship between the amount of force F produced by the linkage system 31 to operate flexible rod element 71 and mirror structure 91 is shown in FIG. 6. Further, the amount that linkage system 31 rotates is dependant upon the placement of anchor stops 101a and 101b, but preferably rotates up to 120 degrees. Because of the position and design of curved drive link 32 within linkage system 31, and because curved drive link 32 is rotationally coupled to pusher rod 51, curved drive link 32 is adapted to provide an axial thrust force F on pusher rod 51 at any angular rotation of linkage system 31 between 0–180 degrees. Next, pusher rod 51 travels in an axial direction to generate axial force F to flexible rod element 71. Then, flexible rod element 71, upon being axially forced by pusher rod 51, buckles upon application of predetermined force F so as to move out of and into wafer 9's plane of fabrication. Because flexible rod element 71 is coupled to mirror structure 91, mirror structure likewise moves out of and into wafer 9's plane of fabrication. This arrangement is illustrated in FIG. 5. Depending upon the amount of force F supplied by primary driver means 11, mirror structure 91 moves into or out of wafer 9's plane of fabrication by angle a (as seen in FIGS. 3a–3c), which is preferably 45 degrees. As such, an external electromagnetic source, such as a laser, can direct an electromagnetic signal to mirror 93 which, due to its high reflectivity, can redirect the electromagnetic signal to a different coordinate path dependent upon the angle α.

In all embodiments described, the predetermined force F is approximately consistent at each step of operation, however, force F may vary due to natural forces such as friction. Moreover, as seen in FIG. 6, the force initially applied by primary driver means 11 to linkage system 31 is high, and as mirror 93 is raised out of the plane of wafer 9, the force F required to raise mirror 93 will decrease.

Figure 7:
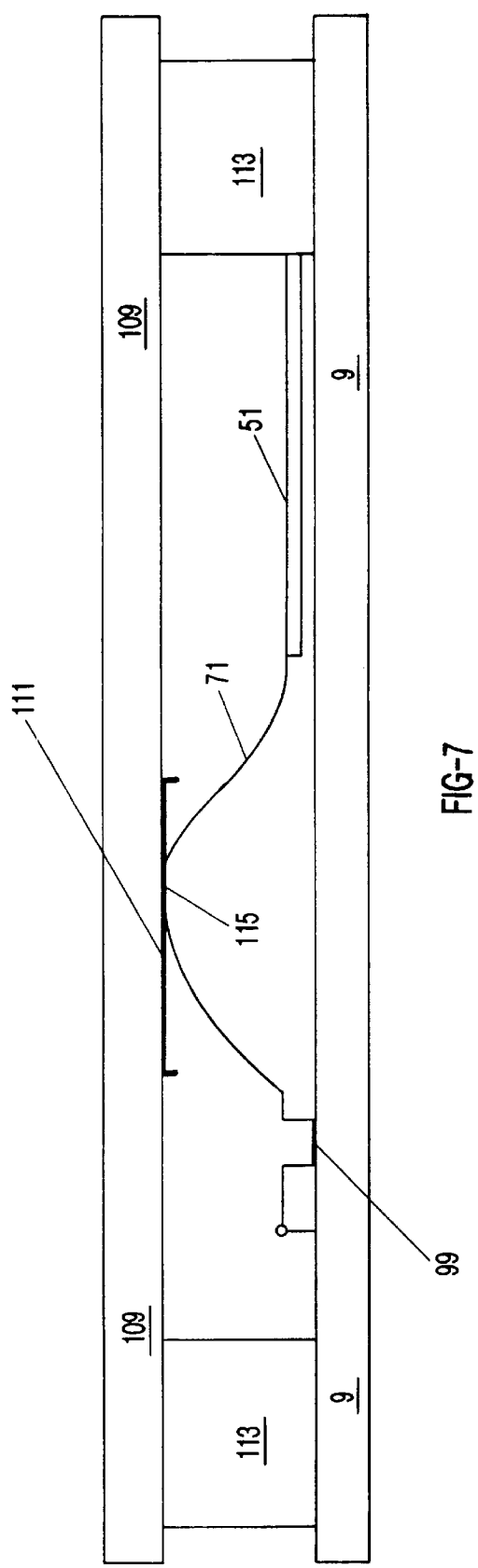
FIG. 7 depicts an alternate embodiment of the present invention.

An alternate embodiment of the present invention is partially illustrated in FIG. 7. In this embodiment, two wafers (9 and 109) are placed adjacent to each other by spacers 113. Upon wafer 109 is fabricated at least one electrical circuit 111, and upon wafer 9 is fabricated at least one electrical circuit 99 which is in electrical communication with contact structure 115. Contact structure can be formed, for example, from any material which reduces contact resistance. When pusher rod 51 applies an axial force upon flexible rod element 71, flexible rod element 71 buckles and contact structure 115 substantially moves out of wafer 9's plane of fabrication and electrically contacts electrical circuit 111, thereby causing electrical circuit 111 and circuit 99 to be in electrical communication. In this fashion, the present invention allows for redirection (or, switching) of an electrical signal between two or more electrical circuits formed on different wafers.

Figure 8:
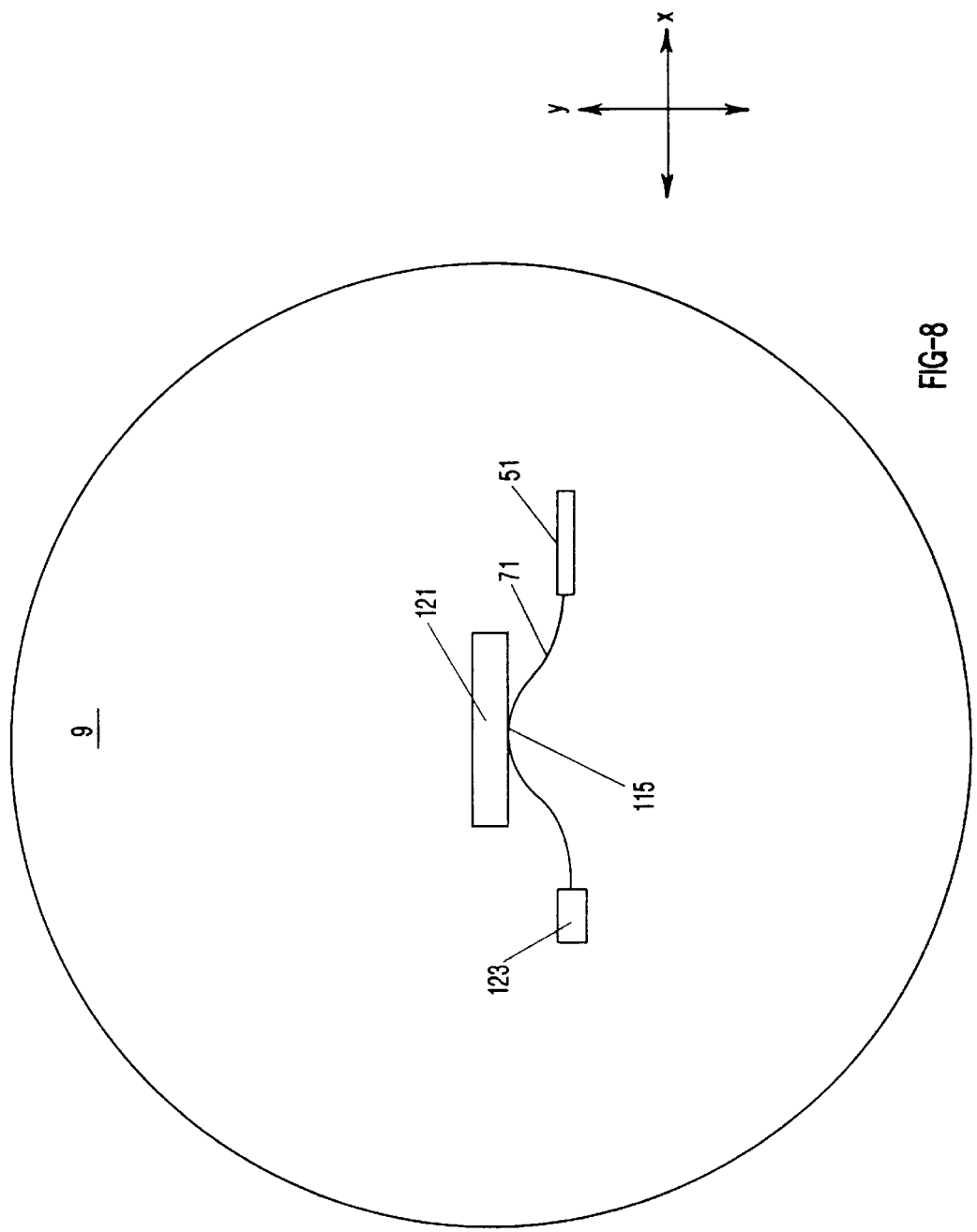
FIG. 8 illustrates another alternate embodiment of the present invention.

Another alternate embodiment of the present invention is illustrated in FIG. 8. In this embodiment, electrical circuit 121 is formed upon wafer 9. Similarly, electrical circuit 123 is formed upon wafer 9 and is in electrical communication with mirror structure 91. Flexible rod element 71 is designed to buckle in the y coordinate directions so that contact structure 115 similarly follows the path of element 71's buckling direction. When flexible rod element 71 is buckled (as, for example, in the y direction as seen in FIG. 8), contact structure 115 remains within wafer 9's plane of fabrication, yet allows for electrical contact with electrical circuit 111, thereby causing electrical circuit 111 and circuit 99 to be in electrical communication. In this fashion, the present invention allows for redirection (or, switching) of an electrical signal between two or more electrical circuits formed on the same wafer.

Other variations and modifications of the present invention will be apparent to those of ordinary skill in the art, and it is the intent of the appended claims that such variations and modifications be covered. The particular values and configurations discussed above can be varied, are cited to illustrate particular embodiments of the present invention and are not intended to limit the scope of the invention. It is contemplated that the use of the present invention can involve components having different characteristics as long as the principle, the presentation of an apparatus and method which redirects electromagnetic signals, is followed.

I claim:

1. A device for redirecting electromagnetic signals, the device comprising:
   (a) a substrate base having a surface;
   (b) a primary driver means adapted to provide a predetermined force;
   (c) a linkage system coupled to the primary driver means in a gear-like fashion and adapted to amplify the force from the primary driver means;
   (d) a pusher rod rotationally coupled to the linkage system;
   (e) a flexible rod element coupled to the pusher rod, the flexible rod element buckling upon application of the predetermined force and unbuckling upon removal of the predetermined force, the flexible rod element adapted to move out of and into the substrate; and
   (f) a mirror structure coupled to the flexible rod element at one end through a first connecting means, and coupled to the substrate through a second connecting means, the mirror structure moving out of the substrate when the flexible rod buckles and into the substrate when the flexible rod unbuckles,
   the primary driver means, linkage system, pusher rod, flexible rod and mirror structure all being on the substrate base.

2. The device of claim 1 wherein the primary driver means is at least one actuator adapted to convert an oscillatory motion to a rotational motion.

3. The device of claim 1 wherein the primary driver means is a microengine fabricated in a micro domain.

4. The device of claim 3 wherein the microengine is a micrometer-sized device adapted to drive the linkage system in gear-like fashion.

5. The device of claim 4 wherein the linkage system further comprises a segmented gear pivot connected to the substrate surface, a circular hub connected to the segmented gear pivot, an outer gear, a plurality of spokes interconnecting the outer gear to the circular hub, and a drive link rotationally coupled to the circular hub.

6. The device of claim 5 wherein a first end of the drive link is curved, the first drive link end being coupled to the circular hub to prevent contact with the gear pivot.

7. The device of claim 6 wherein the drive link is rotationally coupled to the circular hub at a pivot joint which approximately axially intersects a center of the circular hub.

8. The device of claim 5 wherein a first end of the drive link is rotationally connected to the circular hub at a first pivot joint, a second end of the drive link is rotationally connected to the pusher rod at a second pivot joint, the first pivot joint and the second pivot joint line up axially through a center of the segmented gear pivot.

9. The device of claim 5 further including a plurality of anchor stops fabricated upon the substrate base at predetermined locations, the locations being determined to prevent a full angular rotation of the linkage system.

10. The device of claim 9 wherein the anchor stop locations are placed to limit the rotation of the linkage system between 0 to 180 angular degrees.

11. The device of claim 10 wherein the anchor stop locations are placed to limit the rotation of the linkage system between 0 to 120 angular degrees.

12. The device of claim 4 wherein the pusher rod is structurally adapted to transfer an axial force from the linkage system to the flexible rod element.

13. The device of claim 4 further including a plurality of guides fabricated upon the substrate base immediately adjacent to the pusher rod to ensure that the pusher rod maintains an axial directed movement.

14. The device of claim 13 wherein the plurality of guides are cam roller bearings.

15. The device of claim 13 wherein the plurality of guides are interconnected by one or more support structures to prevent the pusher rod from rising out of the substrate.

16. The device of claim 4 wherein upon an application of the predetermined force, the flexible rod element forms an arch-like structure.

17. The device of claim 4 wherein the mirror structure includes a reflective mirror integrally attached between the first connecting means and the second connecting means.

18. The device of claim 4 wherein the mirror structure includes a reflective mirror, the first connecting means and the second connecting means are hinges to allow the reflective mirror to be rotationally attached between the first connecting means and the second connecting means.

19. A method of selectively redirecting electromagnetic signals, the method comprising the steps of:

(a) fabricating a substrate to produce a primary driver means adapted to provide a predetermined force, a linkage system coupled to the primary driver means in a gear-like fashion, a pusher rod rotatably connected to the linkage system by a curved drive link within the linkage system, a flexible rod element interconnected to the pusher rod and a mirror structure attached to the pusher rod at one end and attached to the substrate at another end, the mirror structure having a reflective mirror which is substantially in the substrate;

(b) engaging the primary driver means to generate the predetermined force on the linkage system to cause the linkage system to partially rotate-, (c) transferring the predetermined force from the linkage system to the pusher rod by a curved drive link, (d) transferring the predetermined force from the pusher rod to the flexible rod element, the flexible rod element buckling in arch-like fashion with the application of the predetermined force and unbuckling with a removal of the predetermined force;

(e) transferring the predetermined force from the flexible rod element to the mirror structure;

(f) and moving the mirror structure and the flexible rod element out of and into the substrate to achieve a predefined angle of the mirror structure with respect to the substrate.

20. The method of claim 19 further including the steps of:

(a) allowing a remote electromagnetic source to direct an electromagnetic signal to the reflective mirror in the mirror structure; and (b) redirecting the electromagnetic signal.

21. An apparatus upon in the microdomain for changing the coordinate direction of electromagnetic signals sent to the apparatus, the apparatus comprising:

(a) a first wafer;

(b) a microengine on the first wafer to generate a predetermined force;

(c) a linkage system on the first wafer, the microengine coupled to the linkage system in a gear-like fashion;

(d) an elongated pusher rod on the first wafer and rotationally coupled to the linkage system;

(e) a flexible means on the first wafer, the flexible means buckling to form an arch-like structure when the predetermined force is applied, the flexible means attached to the pusher rod; and (f) a means for redirecting electromagnetic signals on the first wafer, the means for redirecting coupled to the means for buckling at one end through a first connecting means, and coupled to the substrate through a second connecting means, the linkage system and the pusher rod both adapted to transfer the predetermined force to the means for buckling and to the means for redirecting to allow the flexible means and the means for redirecting to move out of and into the first wafer.

22. The apparatus of claim 21 wherein the means for redirecting further includes a reflective mirror.

23. The apparatus of claim 21 further including at least one anchor stop upon the first wafer at predetermined locations, each of the locations determined to prevent a full angular rotation of the linkage system.

24. The apparatus of claim 22 wherein the first wafer is a single silicon crystal.

25. The apparatus of claim 23, further including a second wafer having at least one second electrical circuit thereon, the second wafer being disposed adjacent to the first wafer by at least one spacer, the first wafer further including at least one electrical circuit first thereon and in an electrical communication with the means for redirecting electromagnetic signals, wherein when the predetermined force is transferred from the linkage system and the pusher rod to the means for buckling, the means for redirecting moves out of the first wafer into the second wafer's plane of fabrication to make an electrical contact with the second electrical circuit.

26. A device for redirecting electrical signals on a single wafer, the device comprising:

(a) a wafer;

(b) a primary driver means on the wafer to generate a predetermined force, (c) a linkage system on the wafer coupled to the primary driver means in a gear-like fashion and adapted to amplify the force from the primary driver means;

(d) a pusher rod on the wafer and rotationally coupled to the linkage system;

(e) a flexible rod element on the wafer and coupled to the pusher rod, the flexible rod element buckling upon application of the predetermined force and unbuckling after a removal of the predetermined force, the flexible rod element moving within the wafer, (f) a contact structure on the wafer and coupled to the flexible rod element at one end through a first connecting means, the contact structure adapted to move within the wafer;

(g) a first electrical circuit on the wafer and electrically attached to the contact structure; and (h) a second electrical circuit adjacent to the contact structure on the wafer, wherein when the predetermined force is transferred from the linkage system and the pusher rod to the flexible rod element, the contact structure moves within the wafer to make electrical contact with the second electrical circuit on the wafer.

27. The device of claim 26 wherein the primary driver means is a microengine.

28. The device of claim 27 further including a plurality of anchor stops fabricated upon the wafer at predetermined locations, the locations selected to prevent a full angular rotation of the linkage system.

29. The device of claim 27 further including a plurality of guides fabricated upon the wafer adjacent to the pusher rod to ensure an axial direction of the pusher rod.

* * * * *